US006925119B2

(12) United States Patent
Bartolucci et al.

(10) Patent No.: US 6,925,119 B2
(45) Date of Patent: Aug. 2, 2005

(54) PROCESS AND SYSTEM FOR THE COMPRESSION OF DIGITAL VIDEO SIGNALS, A SYSTEM AND A COMPUTER PROGRAM PRODUCT THEREFOR

(75) Inventors: Vilim Bartolucci, Milan (IT); Danilo Pau, Sesto San Giovanni (IT); Emiliano Piccinelli, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 484 days.

(21) Appl. No.: 10/247,845

(22) Filed: Sep. 20, 2002

(65) Prior Publication Data

US 2003/0072366 A1 Apr. 17, 2003

(30) Foreign Application Priority Data

Sep. 20, 2001 (EP) ............................................ 01830597

(51) Int. Cl.[7] ............................. H04B 1/66; H04N 7/28
(52) U.S. Cl. ............................... 375/240.03; 375/240.22
(58) Field of Search ...................... 375/240.03, 240.04, 375/240.05, 240.22, 240, 240.01; 348/403.1; 382/240; 358/261; H04B 1/66; H04N 7/28

(56) References Cited

U.S. PATENT DOCUMENTS

| 5,561,464 | A | * | 10/1996 | Park ........................ 375/240.1 |
| 5,828,413 | A | * | 10/1998 | Jayant et al. .......... 375/240.22 |
| 6,157,746 | A | * | 12/2000 | Sodagar et al. ............. 382/240 |
| 2002/0080408 | A1 | * | 6/2002 | Budge et al. ............ 358/261.2 |

FOREIGN PATENT DOCUMENTS

| EP | 001296524 A1 | * | 3/2003 | ............ H04N/7/28 |
| WO | 0 524 871 A1 | | 1/1993 | |

OTHER PUBLICATIONS

Boon–Lock, Y. et al., "A Fixed–Rate Vector Quantizer Based On Pyramid–Bounded Integer Lattices For Image Compression," *IEEE*, 578–582, 1994.

Breeuwer, M., "Transform Coding of Images using Directionally Adaptive Vector Quantization," *IEEE*, 788–791, 1988.

D'Alessandro, P. et al., "Video Coding Scheme Using DCT–Pyramid Vector Quantization," *IEEE Transactions on Image Processing*, 4 (3), 309–318, Mar. 1995.

Mohd–Yusof, Z. et al., "An Entrophy–Coded Lattice Vector Quantizer for Transform and Subband Image Coding," *IEEE Transactions on Image Processing*, 5(2), 289–298, Feb. 1996.

Fischer., T. R., "A Pyramid Vector Quantizer," *IEEE Transactions on Information Theory*, IT–32(4), 568–583, Jul. 1986.

* cited by examiner

*Primary Examiner*—Tung Vo
(74) *Attorney, Agent, or Firm*—Lisa K. Jorgenson; E. Russell Tarleton; Seed IP Law Group PLLC

(57) ABSTRACT

A process for encoding digital video signals organized in frames comprises the operations of dividing the frames into blocks starting from macroblocks subjected to motion-compensation and applying to the blocks a discrete cosine transform in such a way as to generate respective sets of coefficients. The sets of coefficients are then assembled by being organized into sets of vectors by a assembling module. Once the variance of the vectors has been detected, the vectors themselves are quantized on a number of available bits by a pyramid vector quantizer, associating to the vectors respective quantization pyramids having given sizes according to the variance detected and to the number of available bits. Finally, the vectors are encoded with respective codewords.

51 Claims, 4 Drawing Sheets

PROCESS AND SYSTEM FOR THE COMPRESSION OF DIGITAL VIDEO SIGNALS, A SYSTEM AND A COMPUTER PROGRAM PRODUCT THEREFOR

BACKGROUND OF THE INVENTION

1. Field of the Invention

The present invention relates to techniques for compression of digital video signals.

These techniques, which aim at representing an image with the smallest number of bits possible, at the same time preserving the level of quality and intelligibility required for a given application, pursue reduction of the channel band required by image-transmission systems (digital television, video conferences, etc.) and, in a symmetrical and parallel way, reduction of the storage space necessary for storing the images and sequences on optical or magnetic media, such as CDs, DVDs, etc.

2. Description of the Related Art

In 1988 the Moving Picture Experts Group (MPEG) started its activity as a work group in the ISO/IEC framework with the aim of defining a standard for digital audio and video compression. In 1993 the MPEG2 standard was defined which is able to handle interlaced images for the encoding of television signals with the aim of supplying a wide range of bitrates (2–20 Mbps) and of variable resolutions. In particular, the standard television (SDTV) signal can be encoded with a bitrate of between 4 and 9 Mbps, whilst the high-definition television (HTDV) signal can be encoded with a bitrate of from between 15 and 25 Mbps.

The biggest difficulty encountered in defining the MPEG2 standard derives from the need to obtain a very high level of compression, combined with the need to guarantee the possibility of random access to the compressed video signal. The first objective may be achieved only by using an "interframe" type of encoding, i.e., one that is based on the information contained in more than one frame at a time, whilst the second requires an "intraframe" type of encoding, i.e., one based only on the information contained in a given frame. The efficiency of the MPEG2 standard consequently depends upon the compromise that is reached between the two types of encoding. To obtain a high compression ratio it is of fundamental importance to reduce the redundancy in the signal and to discard the information that is not important for the user. The MPEG2 compression algorithm is therefore a lossy encoding algorithm, i.e., one with loss of information.

The aforesaid algorithm basically comprises three processing components:

motion-compensation, for reducing the temporal redundancy of the signal, which is based upon recognition of the existence of image portions that remain the same in successive frames;

conversion, which aims at reducing the spatial redundancy of the signal and is based upon the recognition of image portions that remain the same within a frame; and entropic encoding for reducing statistical redundancy.

In order to manage the different levels of redundancy present in the video signal, three types of frames are defined: intra (I), prediction (P), and interpolation or bidirectional (B).

All three types of images (I, P and B) still contain a high level of spatial redundancy. In order to reduce it, the macroblocks that define the images are further subdivided into blocks of 8×8 pixels each, which are converted into values of spatial frequency by means of the discrete cosine transform (DCT). The DCT presents the advantage of de-correlating the coefficients of a block and concentrating most of the information in the low-frequency region, but in effect it does not reduce the amount of data necessary for representing an image.

Most of the bitrate reduction is consequently obtained by means of quantization, which, in the MPEG2 standard is a uniform scalar quantization: each coefficient belonging to a macroblock is divided by a given number using the rate-control algorithm. Given the characteristics of the DCT, in the regions corresponding to the highest spatial frequencies there is thus present a large number of zero coefficients, which are encoded efficiently using the run-length coding (RLC) technique. To reduce the residual statistical redundancy of the quantized signal, together with the RLC technique, Huffman entropic coding is used, which assigns the shortest codewords to the most frequent combinations (variable-length coding—VLC). As understood, quantization yields a good degree of compression but with a slight loss of quality; in fact, it is the only irreversible operation of the entire encoding algorithm. In the MPEG2 standard a scalar quantization is used that is based upon threshold encoding. This is an adaptive method, where in each block those coefficients are preserved that exceed a given threshold. In type-I blocks, the alternating-current (AC) and direct-current (DC) components are quantized separately. As regards macroblocks belonging to type-P or type-B frames, instead, the quantizer is the same for both types of component.

The quantization matrices are used to increase the quantization pitch of the coefficients that are least significant in the block. As has already been said, the DCT has the merit of concentrating most of the information in a small number of low-frequency coefficients. In type-I blocks, the information contained in the high-frequency coefficients is generally negligible and above all not very visible to the human eye. For this reason, the attempt is made to quantize the high-frequency coefficients in a coarser way, favoring the low-frequency ones. In type-P and type-B blocks, the coefficients represent the prediction error with respect to the reference blocks pointed by the motion vector. Their energy content is no longer strongly localized as in the case of type-I blocks, and the use of quantization matrices in this case is less important. For this reason, in the MPEG2 standard, the quantization matrix used by default for the blocks other than the intra blocks is constituted by coefficients that are all equal. Of course, the quantization matrices, for all types of frames, can be specified from outside and can be different for each image of the sequence. When this happens, the said matrices must be encoded and introduced into the MPEG bitstream.

BRIEF SUMMARY OF THE INVENTION

Even though the MPEG standard has met with considerable success over the years, the need is, however, felt to have available solutions which, given the same level of quality, enable acquisition of a higher level of compression as compared to the MPEG2 standard, maintaining, at the same time, the main characteristics of the standard, such as the possibility of real-time encoding and decoding the signal.

The embodiments of the present invention provide a solution that is able to meet the above need. The aforesaid is achieved by a process having the characteristics specified in the claims that follow. Thus, the invention also relates to a corresponding system, as well as to the corresponding computer program product that can be directly loaded into the memory of a digital computer and includes software code portions for performing the process according the invention when said product is run on a computer.

The embodiments of the invention use, for the purposes of reducing the spatial redundancy and the statistical redundancy of the coefficients, a system different from the one adopted in the MPEG2 standard, maintaining unaltered the mechanisms of motion estimation and motion compensation.

The solution according to one embodiment of the invention uses, instead of scalar quantization, a particular technique of vector quantization that enables the statistics of the DCT coefficients to be fully exploited.

Specifically, a solution according to an embodiment of the invention resorts to the use of a vector quantizer (VQ).

The superiority of vector quantizers as compared to scalar quantizers is well known in the literature, as emerges, for example, from A. Gersho, R. M. Gray, "Vector Quantization and Signal Compression," Kluwer Academic Publishers, 1995.

In particular, the solution according to the invention exploits the pyramid vector quantizer (PVQ) described in T. R. Fischer, "A pyramid vector quantizer," *IEEE Trans. Inform. Theory* Vol. UT-32 July 1996 No. 4, pp. 137–145. This quantizer enables reduction of the complexity intrinsic in the implementation of a vector-quantization algorithm, exploiting the geometrical properties deriving from the statistics of the source signal.

The vector quantizer in question is based upon the geometrical structure of a Laplacian source, which is the statistical model that best approximates the signal deriving from application of the DCT to a digital image. The encoding process takes place by means of a fast algorithm that calculates the codewords to be assigned to the vectors by appropriately adding together the integers contained in a pre-defined and stored table. The aforesaid characteristics have rendered the quantizer in question particularly interesting in the framework of compression of digital images, as is documented, for example, by the following works: R. Sannino, "Transform coding of images using a modified pyramid vector coder," Alcatel; F. Bellifemine, R. Picco, "Video Signal Coding with DCT and Vector Quantization," *IEEE Trans. Commun.*, Vol. 42 Nos. 2, 3, 4 February, March, April 1994; and S. Mohd-Yusof, T. R. Fischer, "An Entropy-coded Lattice Vector Quantizer for Transform and Subband Image Coding," *IEEE Trans. Image Processing* Vol. 5 No. 2 February 1996.

In addition, the embodiments of the invention provide a control technique for using the solution developed by Fischer in the quantization of the DCT coefficients instead of the scalar quantization algorithm employed in the MPEG2 standard.

In the above context, the solution according to the invention can perform both the assembling function, i.e., the choice of the coefficients to be inserted into the vectors to be quantized, and the bit-allocation function, i.e., the determination of the optimal distribution of the bits to the vectors.

The foregoing achieves an excellent compromise between the problems of computational and architectural complexity and the hypotheses regarding the statistics of the coefficients that are at the basis of the operation of Fischer's quantizer.

As regards the bit-allocation function, the solution according to the disclosed embodiments of the invention is based upon a modification of the rate control of the MPEG2 standard in such a way as to adapt it to the characteristics required by the pyramid vector quantizer.

In the MPEG2 standard, encoding of the DCT coefficients is performed by means of the joint use of the run-length technique and of Huffman entropic coding.

In the present invention, the DCT coefficients are appropriately re-ordered in N vectors that are encoded with a number of bits determined each time by the rate-control algorithm according to their characteristics.

The encoder according to the invention is able to determine the length of the codewords assigned to the vectors thanks to the collateral information transmitted by the encoder.

The result of this encoding action is a non-standard bitstream which maintains the fundamental characteristics of an MPEG2 bitstream, but which is able to encode a sequence with a lower bitrate with respect to the standard, maintaining the same objective (PSNR) and perceptive quantity.

BRIEF DESCRIPTION OF THE SEVERAL VIEWS OF THE DRAWINGS

The invention will now be described, purely by way of non-limiting example, with reference to the annexed drawings, in which.

DETAILED DESCRIPTION OF THE INVENTION

Figure 1:
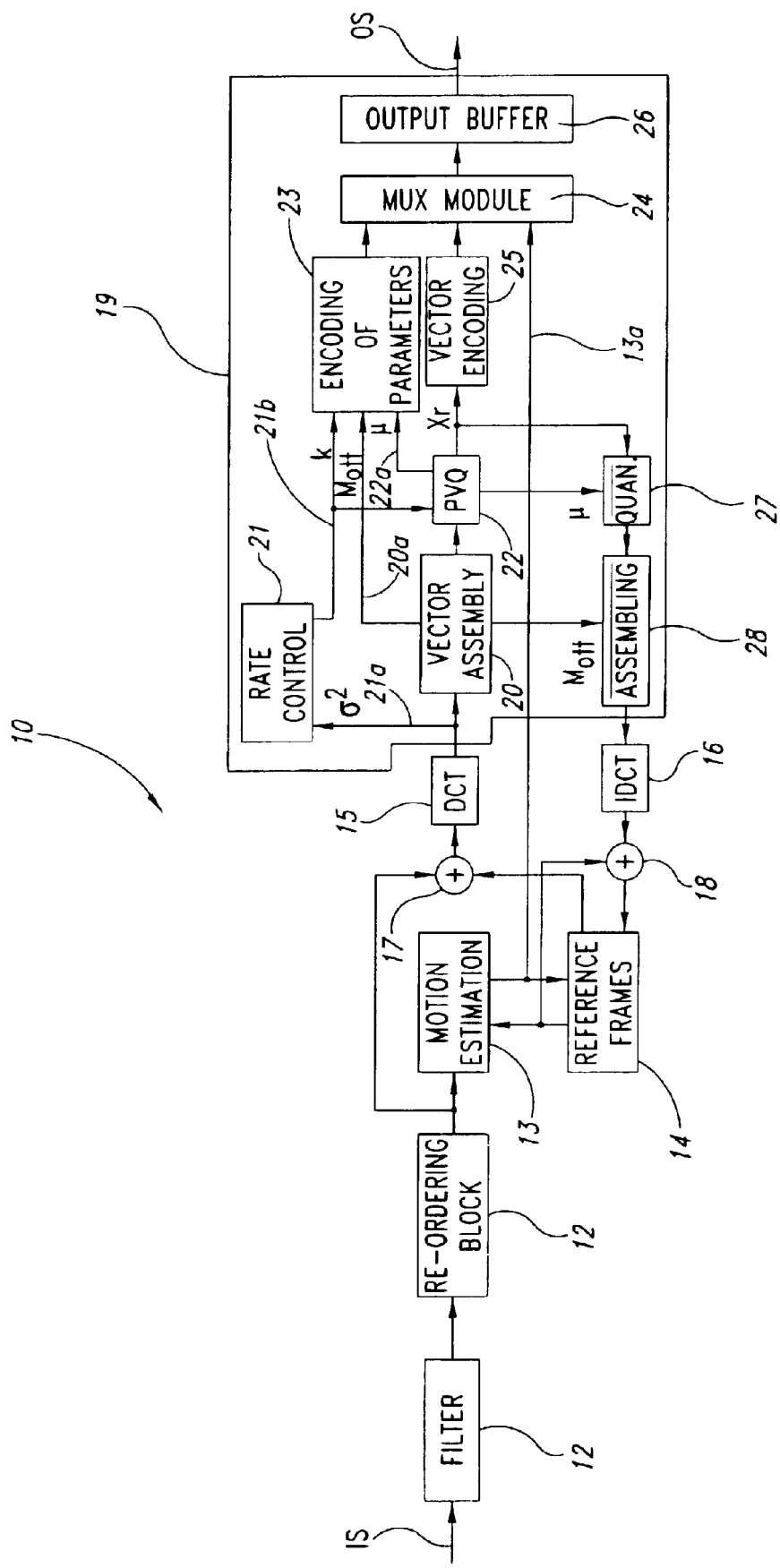
FIG. 1 illustrates, in the form of a block diagram, the structure of an encoder according to the invention.
Figure 2:
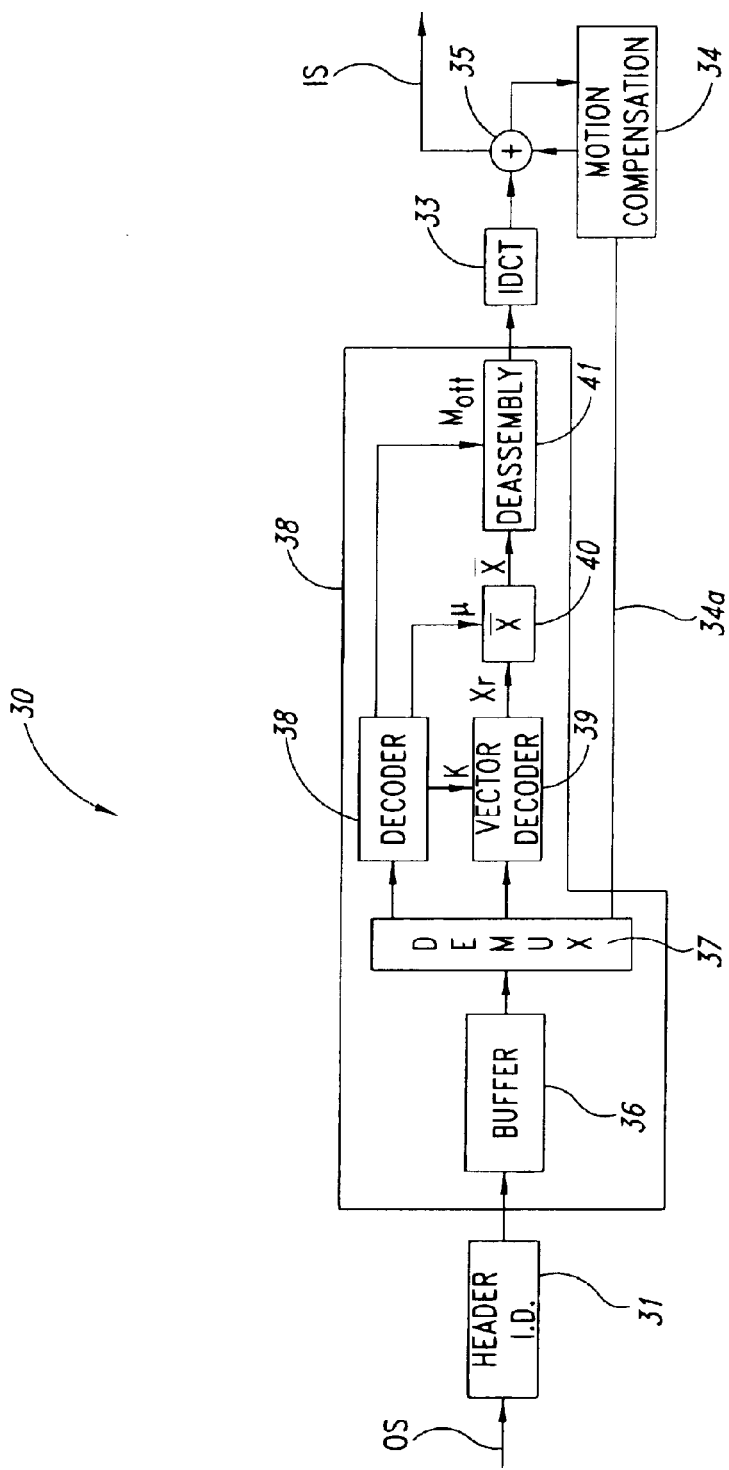
FIG. 2 illustrates, again in the form of a block diagram, the structure of a decoder according to the invention.

In the block diagrams of FIGS. 1 and 2, the reference numbers 10 and 30 respectively designate an encoder and a decoder of digital video signals that operate according to the invention.

Basically, the encoder 10 is designed to generate, starting from an input digital video signal IS, a compressed and encoded output digital video signal OS.

In a dual way, the decoder 30 is designed to receive at input a signal corresponding to the signal OS and to return at output a signal—virtually—corresponding to the signal IS.

Examining first the structure of the encoder 10, the images of the sequence to be encoded that constitute the signal IS are first of all converted into the format 4.2.0 by means of filtering of the chrominance components, which is performed in a filter 11.

Subsequently, in a re-ordering block designated by 12, the frames are re-organized according to an appropriate encoding order (for example, I, P, B, B, P, . . . ), to be then divided into macroblocks and motion-compensated.

The latter two operations are carried out in a motion-estimation module 13 in co-operation with a module 14 that supplies the information on the reference frames. The macroblocks thus further partitioned into 8×8 blocks are subjected to the discrete cosine transform (DCT) in a block designated by 15.

The block designated by 16 is instead a block which implements the inverse discrete cosine transform (IDCT) according to a general feedback scheme, starting from the subsequent stages of the encoder.

The reference numbers 17 and 18 designate two adder nodes. The node 17 is designed to feed the DCT module 15 with frames coming from the module 12 and frames coming from the module 14. The node 18, instead, combines, in view of their being fed to the module 14, previous frames and the homologous information coming from the IDCT module 16.

The foregoing corresponds to criteria that are altogether analogous to the criteria of implementation of the MPEG2 standard. In view of the notoriety of the aforesaid standard, any further detailed information is to be considered altogether superfluous herein.

The solution of the disclosed embodiments of the invention resides in a part of the decoder 10 designated as a whole by 19, where the following functions are performed:

quantization and encoding of the DCT coefficients coming from the module 15; and control of said functions in terms of rate control.

Basically, in the part of the encoder designated by 19, a number of main modules may be identified, which perform the following functions:

assembling of vectors—module 20;

rate control—module 21;

pyramid vector quantization (PVQ)—module 22;

encoding of the quantization and assembling parameters—module 23; and generation of the output bitstream OS.

The latter function is assigned mainly to a MUX module 24 which feeds an output buffer 26, combining the information coming from the parameter-encoding module 23 with the encoded vectors coming from a vector-encoding module 25, and again with the motion vectors coming from the motion-estimation module 13.

The modules designated by 27 and 28, instead, perform functions that are respectively complementary to the quantization function performed by the module 22 and to the assembling function performed by the module 20. The cascading of the modules 27 and 28 is designed to supply the feedback signal that is to be subjected to IDCT in the module 16.

In general terms, the assembling module 20 receives at input the DCT coefficients of a macroblock and re-orders them according to masks (following criteria that will be described in greater detail hereinafter) in a set of N vectors.

The rate-control module 21 is instead sensitive to the variance $\sigma^2$ of the vectors and to the number of bits available for encoding (information received on a line 21$a$ at output from the module 15) so as to be able to determine, for each vector, the most appropriate size of the quantization pyramids, which will be examined in greater detail hereinafter.

The pyramid vector quantizer 22 performs the quantization of the vectors according to the information (mainly, a coefficient K received on a line 21$b$) starting from the rate-control module 21 and encodes the vectors, assigning a codeword to each of them.

For the decoder 30 to be able to reconstruct the compressed sequence correctly, it is necessary to carry out encoding of the quantization and assembling parameters, which are made up both of the size of the pyramids K mentioned previously and of the quantized absolute mean values of the vectors $\mu_q$ (line 22$a$ which connects the module 22 to the input of the module 23) and of the masks used for assembling (represented by a signal $M_{ott}$ supplied by the module 20 to the module 23 on a line 20$a$).

Figure 3:
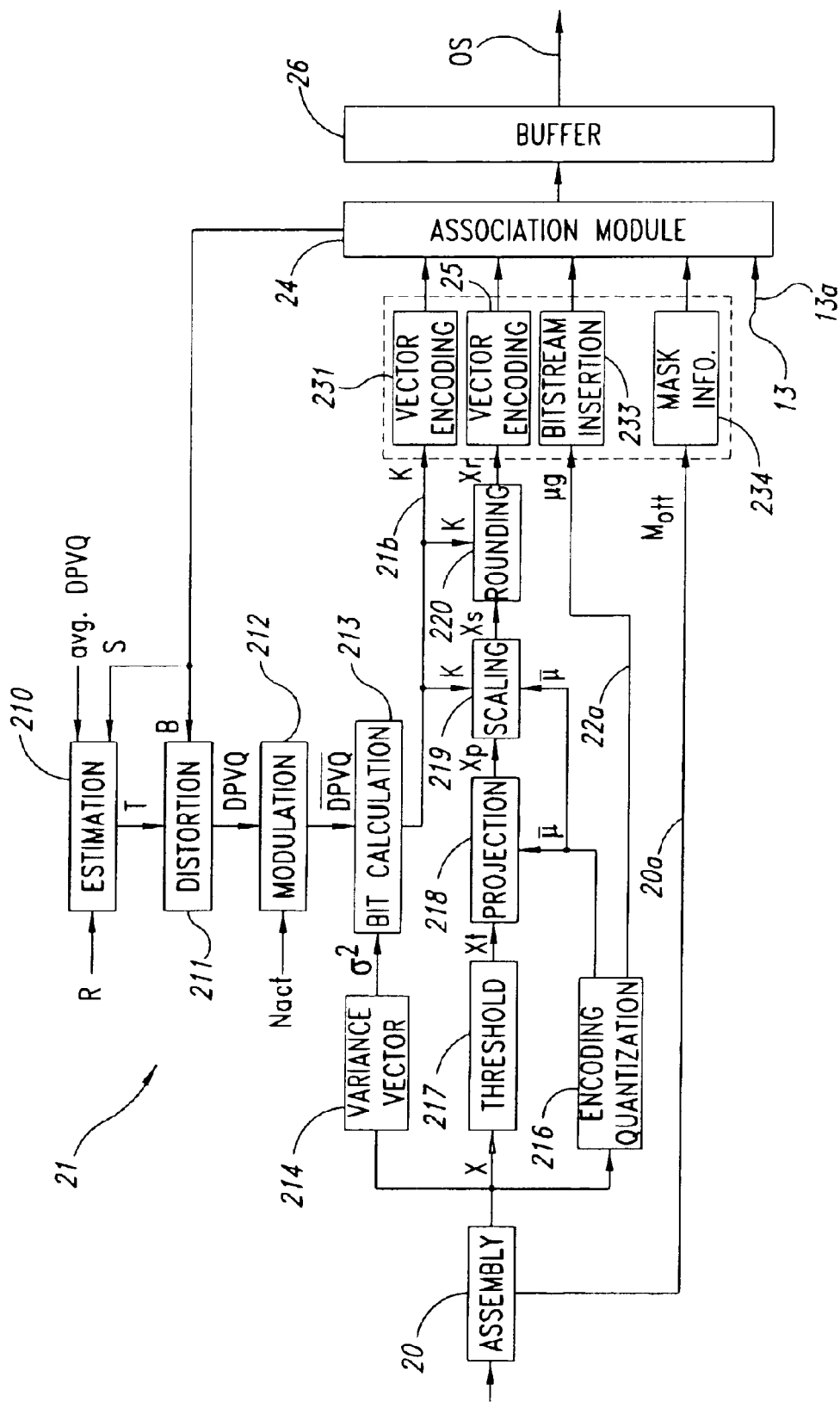
FIG. 3 is a functional block diagram illustrating in greater detail the criteria of operation of a number of parts of the block diagram represented in FIG. 1.

It should be noted that some of the numbers indicated in the general diagram of FIG. 1 are given for immediate reference also in the more detailed diagram of FIG. 3.

The pyramid vector quantizer 22 is based upon the geometrical structure of the Laplacian sources and, as hypothesis, assumes that the values are constituted by random variables that are independent and identically distributed with the probability density $$p_x(x_i) = (\lambda/2)e^{-\lambda|x_i|}.$$

The Laplacian model approximates very closely the statistics of the signal resulting from application of the DCT to a digital image. For the method to be efficient, the vectors must be constituted by coefficients with the same statistical properties, in particular with the same standard deviation. As is known, the DCT concentrates the energy of a pixel block in a small number of coefficients located in low-spatial-frequency regions. The DCT coefficients of a block therefore have a variance very different from one another; consequently, the solution according to the invention envisages, in the currently preferred embodiment, that the vectors are constructed by means of appropriate re-ordering of the coefficients belonging to a single macroblock. Although this hypothesis does not respect fully the hypothesis of independence of the coefficients, it facilitates implementation at a circuit level.

Figure 4:
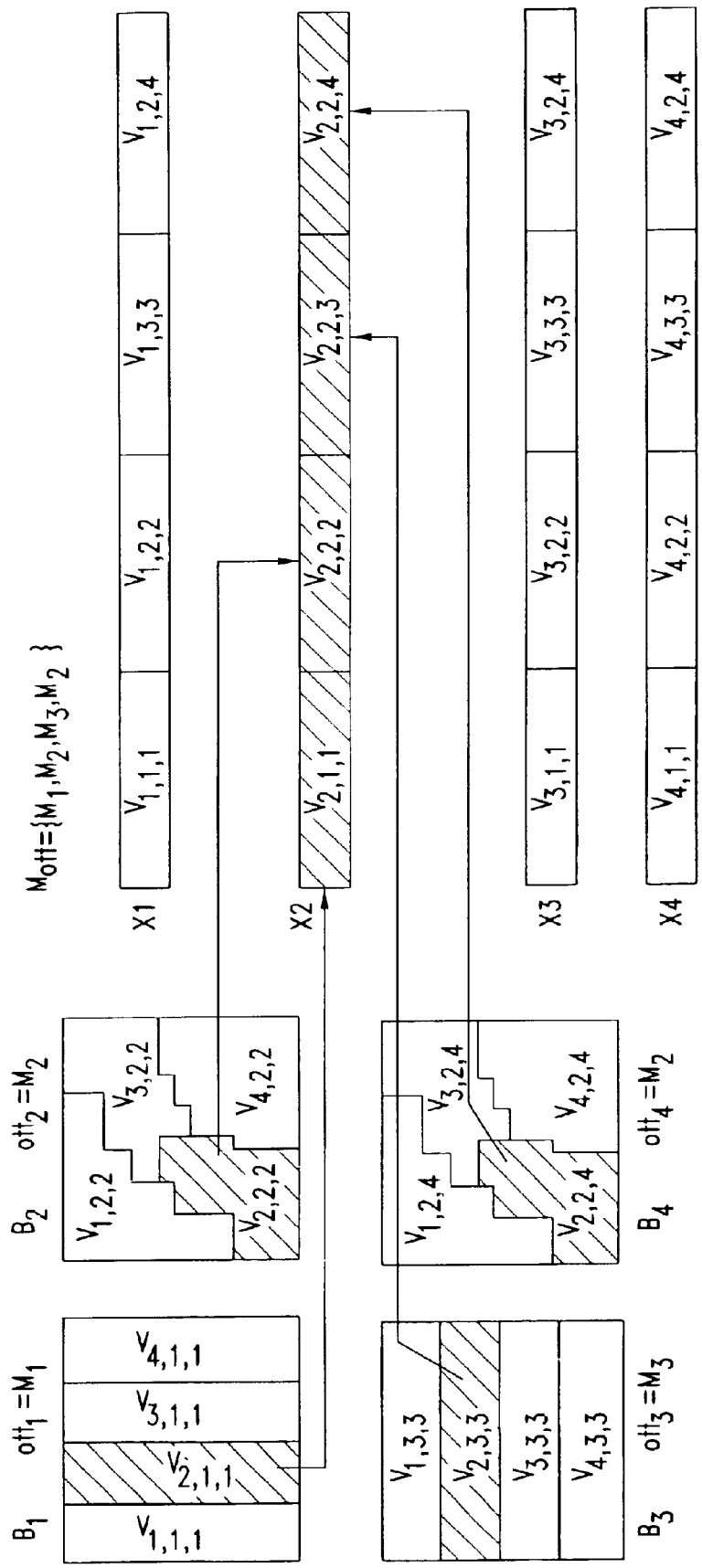
FIG. 4 illustrates an example of assembling of vectors in the framework of the solution according to the invention.

In particular, FIG. 4 shows an example of assembling of four vectors with three masks on four luminance blocks.

In particular, in FIG. 4, $B_b$ (b =1, . . . , B) designates the b-th block subjected to assembling, $M_m$ designates the m-th mask (with m=1, . . . , M), and ott$_b$ designates the optimal mask associated to the block $B_b$.

Again in FIG. 4, $V_{i,m,b}$ designates the i-th subset of the mask $M_m$ of the block $B_b$, whilst $M_{ott}=\{ott_b\}$ designates the combination of optimal masks for each b=1, . . . , B.

Consequently, each block $B_b$ is partitioned into N subsets $V_{i,m,b}$ according to an appropriate mask $M_m$. The subsets with the same index i, hence belonging to different blocks, are aggregated to form the N vectors $X_i$ ready for quantization.

As compared to the use of a single mask which is the same for all the blocks, it is possible to notice experimentally a considerable improvement in the perceptive quality and a reduction in the bitrate due to the better distribution assigned to the vectors according to the choice of the masks.

The latter have therefore been designed, essentially in an experimental way, both taking into account the energy distribution typical of the DCT coefficients of a block, and ensuring that they adapt properly to particular figures in the spatial domain.

For example, a very marked vertical edge in the pixels usually has more energetic DCT coefficients along the first rows of the converted block, whereas a horizontal edge shows the same characteristic along the first columns.

In the example of FIG. 4, three different masks are applied to the four luminance blocks belonging to a macroblock. The blocks are divided into four subsets of 16 coefficients each. In this way, N=4 vectors and L=64 coefficients are obtained. Another solution may be dividing the blocks into eight subsets, thus obtaining N=8 luminance vectors per macroblock with L=32 coefficients each. Not shown in the example are two chrominance blocks which, in the particular case, are assembled in vectors that are distinct from the luminance vectors. It is, however, possible to use masks that cover both the coefficients of the luminance blocks and the coefficients of the chrominance blocks, so generating mixed vectors. The ways for dividing the coefficients of a macroblock are numerous, and virtually infinite. Since it is necessary to transmit to the decoder the information on the make-up of the vectors, the maximum number of combinations and of annexed masks must be set.

Once the masks have been defined, the criteria for determining which of these ensures the best partitioning of a block may be at least two:

maximization of the sum of the absolute values of the subsets; and minimization of the sum of the standard deviations of the subsets calculated with respect to the absolute mean value.

The above two criteria can be applied separately, but it is also possible to use them cascaded, identifying, for example, a set of "good" masks according to the first criterion and then choosing from said set the "optimal" mask on the basis of the second criterion.

The choice of either one criterion or the other depends, ultimately, upon the computational complexity, and hence upon the processing capacity of the specific processing system used for implementing the encoder 10 (and, symmetrically, the decoder 30).

In the above connection, the solution according to the invention is suited for being implemented resorting both to a dedicated processor and to a general-purpose processor, such as a digital signal processor (DSP), adequately programmed with a computer program product according to the invention.

Once the combination of the optimal masks has been identified, the vectors $X_i$ are assembled according to the corresponding combination.

In particular, FIG. 4 shows, purely by way of example, the assembling of four vectors that is obtained from partitioning of four luminance blocks belonging to a macroblock in the hypothesis of an optimal combination of three different masks.

As may be seen, for instance, the vector $X_2$ is constructed by assembling the coefficients of the four subsets highlighted in the figure; namely, $$X_2 = \{V_{2,1,1}, V_{2,2,2}, V_{2,3,3}, V_{2,2,4}\}$$

Usually the possibility is not envisaged of assembling in the same vector subsets coming from the same block, or else coming from different blocks but with non-corresponding indices. This choice constitutes a reasonable compromise between optimal adaptation and number of bits necessary for encoding of the masks.

The masks for intra macroblocks are different from those for non-intra macroblocks. The distinction is necessary because the intra DCT coefficient is usually encoded in a different way, as in the MPEG2 standard. In its stead, there is introduced a zero coefficient, again assembled in the least energetic vector, i.e., the one that is very likely to be discarded during allocation of the bits to the vectors. For non-intra macroblocks this operation is not necessary because all the coefficients of the block are quantized in the same way.

Basically, the assembling function performed in the module 20 has the task of taking the DCT coefficients of a macroblock and dividing them into a set of N vectors in such a way that the quantization and encoding by means of pyramid vector quantization (PVQ) may be as efficient as possible. This target is achieved by choosing the coefficients that constitute the vectors in an adaptive way, at the block level, exploiting some of the information on the local characteristics of the image.

In the MPEG2 standard, the rate-control function establishes the level of quantization of the DCT coefficients by calculating, for each macroblock, the parameter defined as mquant, which establishes the number by which all the coefficients of the macroblock are scaled. As has already been said in the introductory part of the present description, the possibility is, on the other hand, envisaged of modifying the quantization pitch for each coefficient in a block by using corresponding quantization matrices.

In the solution according to the invention, the DCT coefficients are grouped by the assembling module 20 into N vectors of L coefficients each. Each vector $X_i$ (where i=1, 2, . . . , N) is quantized according to a parameter $K_i$.

A pyramid $S(L, K_i)$ with a number of integer points on its surface equal to $N(L, K_i)$ is associated to each pair L, $K_i$.

It should be recalled that, in the vector-quantization process developed by T. R. Fischer and documented in the work of this author cited in the introductory part of the present description, a pyramid is defined as the set of the points that geometrically represents the surface of a hyperpyramid in the L-dimensional space. A corresponding random variable r may therefore be considered as a radial parameter that identifies a particular periphery having a constant probability density, or in other words, the surface of the pyramid S(L, r).

Each point on the surface of the pyramid hence corresponds to a vector with integer coefficients of norm $K_i$, to which there may be assigned a codeword of length $bit\_vect_i$ whereby $N(L, K_i)$ is smaller than or equal to $2^{bit\_vect}{}_i$.

In practice, the rate-control module 21 determines the value of $bit\_vect_i$ for each vector of the macroblock, and from this value, by means of a look-up table, the corresponding value of $K_i$, which, transferred via the line 21b to the quantizer 22, will be used precisely for the quantization.

If the diagram of FIG. 3 is now examined, it may be noted that the function just described is more precisely organized into a number of sub-functions assigned to corresponding modules.

A first one of said sub-functions is essentially the allocation of the image bits, namely the calculation of the bit target for encoding of the subsequent image.

The corresponding sub-module, designated by 210 in FIG. 3, is dedicated to the estimation of the number of bits required for encoding the subsequent image.

The corresponding operational scheme is organized according to two steps: i) estimation of the complexity, carried out at the end of encoding of an image; and ii) setting of the target, carried out at start of encoding of an image.

To each image in the sequence there is assigned a measurement of complexity, which is determined by the number of bits S generated for encoding the image and by the mean of the distortions assigned to the macroblocks, i.e., of all the values assumed by the corresponding parameter that are calculated in the second step of the corresponding algorithm. Setting of the target is according to the same criteria as those used in the MPEG2 standard.

The second sub-function, performed by a module 211, corresponds to the rate-control action proper, i.e., to calculation of the level of distortion for the quantization of the vectors of the subsequent macroblock.

In practice, the module 211 determines the value of distortion $DPVQ_j$ to be used for the quantization of the vectors of the j-th macroblock. The operating principle is the same as for the corresponding rate-control step defined in the MPEG2 standard. Calculation of the distortion is carried out according to a feedback parameter r which represents the level of quality with which it is intended to quantize the macroblock, considering the number of bits still available and the number of macroblocks that have remained in the image. The greater the error, the fewer the bits assigned to the macroblocks, and vice versa.

The reference number 212 designates a further module, which, according to the distortion value DPVQ determined in the module 211, performs modulation of the distortion level according to the type of vector, and possibly according to the local activity of the image.

As has been seen previously, not all the vectors have the same importance: the ones that group the low-frequency coefficients contain in fact most of the information present in a block and consequently must be quantized better than the other coefficients. In addition, if distinct vectors are used for the luminance and chrominance coefficients, it is necessary to be able to assign also different distortion levels. Consequently, the module 212 calculates the mean distortion for each vector of the macroblock $i=1, \ldots, N$ by multiplying the reference value $DPVQ_j$ (which represents the distortion level with which the vectors of the j-th macroblock must be quantized) by positive constants.

A constant between 0 and 1 corresponds to a decrease in distortion, whereas a constant greater than 1 corresponds to an increase. With a constant equal to 1 the distortion remains the one fixed for the particular macroblock. The constants associated to the vectors of a macroblock constitute, to all intents and purposes, visibility masks and have a function similar to that of the quantization matrices used in the MPEG2 standard.

It is possible to specify different masks for each macroblock, but usually, for reasons of simplicity, it is expedient to choose one mask for each type of image. In particular, in type-I images a mask $m_I$ is used for all the macroblocks; in type-P images a mask $m_P$ is used for the predicted macroblocks, and the mask $m_I$ is used for the intra macroblocks; and in type-B images a mask $m_B$ is used for the predicted macroblocks, and the mask $m_I$ is used for the intra macroblocks. The masks in question do not concern the decoding step, and consequently do not have to be inserted into the bitstream, as, instead, is the case for the quantization matrices in the MPEG2 standard.

The possibility is envisaged of modulating the value of $DPVQ_j$ according to the normalized activity of the macroblock $Nact_j$, calculated in the same way as in the MPEG2 standard and supplied to the module 212 from outside. The decision on whether to resort to said modulation function must be taken at the start of the process of encoding of a sequence. Tests carried out by the present applicant show that, albeit reducing the objective quality in PSNR terms, this solution improves the visual quality, above all in the uniform regions of the images.

The mean value of $DPVQ_j$ processed in the module 212 converges into a further module 213 designed to perform the allocation of the bits to the vectors, namely the calculation of the number of bits to be used for encoding the vectors of the subsequent macroblock and determining the dimensions of the quantization pyramids.

For the above purpose, the module 213 uses, in addition to the output of the module 212, also the output of a module 214 which makes, according to known criteria, the calculation of the variance of the vectors $\sigma_2$ according to the output signal coming from the assembling module 20.

In practice, the number of bits with which a vector is encoded depends upon the ratio between the sampling variance of the vector and the mean distortion calculated in the module 212.

The result takes into account the number of coefficients in the vector L and is discretized with a finite number of levels that evidently depends upon how many bits it is intended to use for the encoding of $K_i$. There is thus obtained the length in bits of the codeword that is to be assigned to the vector $X_i$ once the latter has been quantized.

Once this quantity and the number of coefficients in the vector L have been fixed, it is possible to choose the size of the quantization pyramid, considering the highest value $K_i$ whereby the pyramid $S(L, K_i)$ satisfies the relation between $N(L, K_i)$ and the quantity $bit\_vect_i$ seen previously. The corresponding algorithm is usually implemented by means of a calculation network and a look-up table.

An important characteristic of the solution according to the invention, if compared with the rate-control function of the MPEG2 standard, hence lies in the fact that the solution according to the invention is not limited to assigning a quantization pitch at a macroblock level, but drops to a lower level, determining the number of bits with which each individual vector can be encoded, and from this, the quantization parameter $K_i$. In the MPEG2 standard, quantization matrices can be used, each of which enables quantization of the coefficients of a block in a different way. The aforesaid matrices can, however, be imposed at the most at the image level, in so far as it is not possible to modify them according to the local characteristics of the image. Instead, in the solution according to the invention, the quantization parameter K is calculated for each individual vector ($K_i$) [$K_i$] according to the value of mean distortion determined in the module 212 and to the sampling variance of the vector.

There will now follow a description of the modules 216 to 220 which, according to the value K determined starting from the rate-control function, perform the encoding quantization proper of the vectors.

In the currently preferred embodiment, the solution according to the invention uses the product-code PVQ model, in which it is possible to determine the pyramid closest to the vector to be quantized among the pyramids belonging to a family of concentric pyramids. Given a pyramid S(L, Q) and a vector of norm H, the vector lies on the pyramid if H=Q, it is external if H>Q, and it is internal if H<Q. In the latter two cases, it is necessary to perform the projection of the vector on the pyramid, an operation that unavoidably introduces an error that is bound to added, on average, to the projection error, albeit implying an increase in the bitrate, in so far as it is necessary to transmit to the decoder the size of the projection pyramid, or in any case a parameter that can be used to get to this information.

Basically, the modules 216 to 220 perform the following functions:

calculation and quantization of the absolute mean value—module 216;

thresholding—module 217;

projection—module 218;

scaling—module 219; and rounding-off—modules 220.

To the above functions there is added, of course, the function of encoding of the quantized vector, performed by the module 25.

In practice, the quantizer 22 of FIG. 1 (which may be ideally viewed as corresponding to the modules 216 to 220 of FIG. 3) receives at input, from the module 20, the vector of the DCT coefficients $X_i$ and the size of the quantization pyramid $K_i$. The latter parameter comes from the rate-control function on the line 21b.

The subscripts i indicate the i-th vector of the macroblock, and the quantization operation is repeated in the same way for each i=1, ..., N.

The size of the projection pyramid is determined according to the quantized mean absolute value represented by the symbol $\bar{\mu}_i$.

The value in question is calculated in the module 216 from the sum of the absolute values of all the coefficients of the vector divided by the number of coefficients L. The result is quantized according to a given quantization pitch, which may be different according to the indices i of the vectors or according to the type of macroblock (whether intra or non-intra). The choice of the aforesaid quantization pitch is made at the start of the process of compression of the sequence and is transmitted to the decoder in the header of the sequence.

Usually, this is not done directly, but rather using the result of the division; namely, the parameter $\mu_q$ is transmitted by the module 216 on the line 22a to the module 233, which inserts it into the bitstream.

The discretized absolute mean value of the vector $X_i$ is obtained by multiplying the value $\mu_q$ by the pitch used previously. The same value is calculated by the decoder in the step of inverse quantization of the vector.

The module 217, which receives the vectors $X_i$ from the module 20, performs a thresholding function consisting in setting to zero all the coefficients of the vector that in magnitude are smaller than a pre-set threshold Th. With a coarse quantization of the factor $\mu_q$, the size of the projection pyramid may be found to be even much smaller than $H_i$, i.e., than the norm of the vector to be quantized. The thresholding function 217 aims precisely at reducing the norm $H_i$, so as to reduce the aforesaid difference, and hence the projection error. The optimal threshold values are usually defined experimentally according to the quantization pitch and are selected at the start of the process of compression of the sequence, if the aforesaid function is enabled. In the currently preferred embodiment of the invention, the scale factor used in the subsequent steps of the quantization depends uniquely upon the value of $\bar{\mu}_i$ determined previously and is not modified by the thresholding operation.

It is emphasized once again that the presence of the thresholding module 217, albeit preferential, is not in any way imperative for the purposes of the invention. This means that the module 218, set cascaded to the thresholding module 217 in the diagram of FIG. 3, may receive at output both the vector coming from the assembling module 20 and the vector resulting from the thresholding action carried out on said vector.

In both cases, the module 218 performs the projection of the vector on the pyramid $S(L, H_{pi})$. The algorithm used, based upon the projection theorem, is described in Fischer's work, already cited more than once in the present description. The output signal from the projection module 210 consists of a vector $X_{pi}$ with real coefficients and norm $H_{pi}$.

The subsequent modules, designated by 219 and 220, carry out a scaling operation and a subsequent rounding-off operation so as to perform effectively a uniform scalar quantization of the vector $X_{pi}$.

The scaling operation consists in dividing all the coefficients of the vector by a scalar determined as a function of the ratio between the sum $H_{pi}$ of the projected vector and the size $K_i$ of the quantization pyramid set by the rate-control function. High values of the aforesaid scale factor generally correspond to values $K_i$ which are very small and which are, on the other hand, associated to not very energetic vectors. In the decoding step, the vector is reconstructed correctly in any case, but the dequantized point may be found to be distant from the original point.

Experiments show that, once a certain scale factor has been exceeded, it is no longer convenient to transmit the vector because the quantization error is much greater than the predicted error. For this reason, it may be advantageous to configure the module 219 in such a way as to carry out a function of saturation of the scale factor at a point corresponding to a maximum value. If the aforesaid identification ratio of the scale factor is higher than the reference value taken as maximum, the corresponding vector is not encoded. In this way, there is obtained in any case an improvement in terms of quality, in so far as the bits spared are allocated to more energetic vectors. If, instead, the scale factor is found to be smaller than the maximum value chosen as limit value, all the coefficients of the vector are divided by this value, giving rise to a vector ($X_{si}$) with real coefficients, the norm of which is equal to $K_i$. In the module 220, the coefficients of $X_{si}$. undergo a rounding-off operation to the integer under the constraint that the norm $H_{ri}$ of the rounded-off vector is equal to $K_i$, a condition which, if verified, makes it possible to assign to the vector a codeword with a length equal to bit_vect$_i$.

It will therefore be appreciated that, in the solution described, each vector is projected on the closest pyramid, and the ratio between the size of the projection pyramid and the sizes of the quantization pyramids determines the scale factor used for the scaling pitch.

In order to reconstruct the quantized vector, it is necessary for the decoder to know the scale factor. This result may be obtained by transmitting, in the bitstream of the signal OS, the value of $K_i$ and the size of the projection pyramid.

The module 25 performs the assignment of the codewords to the vectors $X_{ri}$ generated by the module 220, calculating for each vector a positive integer, the binary representation of which constitutes the codeword. In practice, the said number is given by the sum of the values of the function N(l, k) which associates to each pyramid S(l, k) the number of integer points contained on its surface. The indices l, k are determined according to the values and positions of the coefficients of the vector and to the norm $K_i$. Preferably, in order not to recalculate the values N(l, k) each time, these are stored in a look-up table, and the pairs (l, k) generated during encoding are used as the index of this table, which is known both to the encoder 10 and to the decoder 30.

Of course, in order for the decoder 30 to be able to receive the codewords associated to the vectors, decode them, de-quantize the values obtained, and finally re-order the coefficients, it is necessary for it to have available, in addition to the information regarding encoding of the vectors which is generated in the module 25, also the information regarding the coded-vector pattern at the macroblock level which is to be received from the motion-estimation module 13 on a line designated by 13a (see also the diagram of FIG. 1).

In addition, the decoder must have available the information regarding the parameter K (at a vector level) and the parameter $\bar{\mu}$ (also at a vector level), as well as the information regarding the set of optimal masks $M_{ott}$ at a macroblock level. These items of information are generated in the modules 231, 233 and 234, in such a way that they can be associated, by means of the module 24, with the information on encoding of the vectors (module 25) and on the coded-vector pattern (module 13) in view of buffering thereof in the buffer 26 and transmission thereof as output signal OS.

Considering first the information coded-vector pattern, it should be noted that the N vectors that make up a macroblock do not have all the same probability of being transmitted. At low bitrates, the vectors that group together the coefficients with high spatial frequency are very often found to be zero. On the other hand, the target of the assembling function performed in the module 20 is precisely that of breaking down a macroblock in such a way as to concentrate the most important coefficients in a small number of vectors, thus minimizing the error caused by the possible setting-to-zero of the others.

Practical experiments show that in the compression of a not very energetic sequence at low bitrates there may be as many as 80% of the vectors not encoded. Given that the items of information for each vector are numerous, it is convenient to use a flag bit to signal to the decoder whether a vector is encoded or not encoded. Only in the former case, must the codeword and the other information associated to the quantized vector appear within the bitstream. There is thus obtained the vector-coding pattern made up of N bits, one for each vector of the macroblock. The said information completely replaces the information referred to as CBP (coded block pattern) used in the MPEG2 standard, which, in the encoder according to the invention, has no longer any meaning. The information regarding the vector-coding pattern is constructed for each macroblock and inserted into the bitstream as a variable-length code, with the possibility of it being encoded according to a variable-length coding scheme expressed in the form of a table calculated on the basis of the statistics obtained experimentally on numerous sequences at different bitrates.

As regards, instead, encoding of the parameter K (module 231 of FIG. 3), the length of the codewords is set for each vector by the module 213, and consequently the decoder 30 cannot know of how many bits a codeword is made up if the corresponding value of bit_vect is not specified in the bitstream OS. In addition, for the decoding algorithm PVQ to operate, the pyramid S(L, K) to which the quantized vector belongs must be known. The number of coefficients for a vector L is pre-set, whilst the size of the pyramid K varies from one vector to another and must therefore be transmitted by the bitstream. Since there exists a biunique correspondence between K and bit_vect, it is sufficient to transmit a code representing the pair; consequently the possible pairs are $2^n{}_{bk}$, and a number comprised between 0 and $2^n{}_{bk}-1$ is associated to each of them.

The corresponding identification number is indicated by KBC. In the case of fixed-length encoding, there are thus required $n_{bk}$ bits for encoding the values of KBC for each vector. The bitrate can be reduced by using a predictive encoding without loss with a variable-length code for the prediction error.

Experiments conducted by the present applicant reveal a clear correlation between the values KBC associated to the vectors with the same index belonging to adjacent macroblocks. It is thus possible to use a predictive-encoding scheme subtracting from each $KBC_{i,m}$ the value $KBC_{i,m-1}$ associated to the vector with the same index belonging to the preceding macroblock. For this purpose, in the framework of the module 231 N buffers are used, i.e., one for each type of vector.

Acting on the reset line, the predictor is initialized at the value $KBC_{1,0}$. This takes place simultaneously for all the vectors at the last macroblock of a slice and for each vector individually when the preceding vector has been found to be not encoded. The remainder is encoded using a variable-length code and inserted into the bitstream. It is possible to construct variable-length-coding tables for the aforesaid remainder according to the Huffman algorithm, using results of simulation at high and low bitrates on sequences with different energy characteristics.

Likewise, in order to reconstruct the vectors correctly, the decoder 30 must know the absolute mean value $\mu^-$ used by the encoder during the quantization algorithm. As has already been said, this value is given by the product of $\mu_q$ by the quantization pitch. The value of said quantization pitch for intra and non-intra macroblocks, as well as for each type of vector, is specified in the header of the bitstream and is constant throughout the sequence. Instead, $\mu q$ is different for each vector and is transmitted to the decoder using the same predictive-encoding system mentioned above with reference to the parameter K. This takes place in the module designated by 233, where from each value of $\mu q_{i,m}$ there is subtracted the quantized absolute mean value associated to the vector with the same index belonging to the previous macroblock. Also in this case, N buffers are used, i.e., one for each type of vector. Acting on the restore line, the predictor is initialized at the value $\mu q_{i,0}$, and this is done simultaneously for all the vectors at the last macroblock of a slice and for each vector individually when the preceding vector has been found to be not encoded. The remainder is, also in this case, encoded with a variable-length code and inserted into the bitstream. Also in this case, the corresponding variable-length tables are constructed according to the Huffman algorithm, using the results of simulations carried out at high and low bitrates on sequences with different energy characteristics.

As regards, instead, encoding of $M_{ott}$, the assembling module 20 has the task of re-ordering in an optimal way the coefficients of each macroblock into a set of N vectors. As has already been seen previously, each block is broken down according to the mask that best meets certain given criteria. Since the decoder must reconstruct the macroblocks starting from the de-quantized vectors, it is necessary for the decoder itself to have available the information on the choice of the masks.

If the masks are M and the number of blocks involved in the decomposition is equal to B, $n_{Mott}=B \cdot \log_2$ Mbit are required for encoding the set of optimal masks $M_{ott}$ associated to each macroblock. The bitrate may be reduced using a variable-length encoding generated assigning to each mask a code designated by cod_M. The concatenation of the codes thus assigned to each block gives rise to a string with variable length of $n_{Mott}$ bits. It is possible to calculate experimentally the number of recurrences of all the combinations and, from these data, by means of the Huffman algorithm, to assign the variable-length code to each combination.

From what has been illustrated above, it is evident that the bitstream OS which is to be used in the solution according to the invention has in general a syntax different from the syntax of the MPEG2 standard. In particular, as compared to the MPEG2 structures, the intra and non-intra quantization matrices disappear from the header, and inserted in their stead are the quantization parameters of the absolute mean value.

In the so-called "picture coding extension," the flags q_scale_type, intra_vlc_format and alternate_scan are eliminated. In the framework of the slice, the parameter quantizer_scale_code is eliminated.

The DC coefficients of the intra blocks are encoded using the same technique as that used in the MPEG2 standard and, since they are not included in the DCT vectors, they are inserted in an independent structure.

The macroblock structure is instead modified in order to acquire the information on the quantized DCT vectors. If the macroblock is an intra one, it is necessary to load the structure containing the information on the DC coefficients of the blocks. An element is provided which consists of a variable-length code that represents the vector-coding-pattern string (i.e., the information supplied to the MUX module 24 on the line 13a).

Each bit of the string in question corresponds to one vector. If the bit is at 0 the corresponding vector is not encoded, whereas if the bit is at 1 the corresponding vector is encoded. In the case where all the symbols of the string are 0 no vector of the macroblock has been encoded, and consequently it is not necessary to read the assembling masks. Otherwise, an element is read that contains the variable-length code of the mask combination.

The block structure ( ) defined in the MPEG2 standard is totally replaced by a homologous structure (vector( )) relating to the vectors, in which there are contained the codeword of the vector and the variable-length code of the parameter KBC and of the absolute mean value. The length of the codeword is determined precisely by the parameter KBC and may vary between two maximum and minimum values. It will be appreciated that the above structure needs to be loaded only if, following upon a test on the i-th bit of the string for the vector-coding pattern, it is found that the said i-th bit is at 1 i.e., that the corresponding vector is encoded.

On the basis of the above premises, the description of the structure of decoder 30 is immediate.

The front-end part of the decoder 30 evidently consists of a module 31 which identifies, within the context of the compressed and encoded bitstream OS, the headers containing the various items of information on the encoding performed.

There follows a set of modules, designated as a whole by 32, which performs the characteristic functions of the solution according to the invention so as to generate the de-assembled vectors which are to undergo the inverse discrete cosine transform (IDCT) in a module 33 in order to be able to interact with the motion vectors, which have undergone motion-compensation in a module 34.

The aforesaid interaction takes place, according to altogether known criteria (which are the ones envisaged in the MPEG2 standard), in an adder node 35, which generates at output the decompressed and decoded signal IS.

Passing now on to a more detailed examination of the set of components designated by 32, the reference number 36 designates a buffer which is to serve as a buffer memory for the bitstream OS after detection of the headers in view of the bitstream OS being sent on to a de-MUX module 37 which discriminates, within the bitstream received, three essential components:

the component regarding the motion vectors, which is to be sent on the line 34a to the motion-compensation module 34;

a component regarding the parameters, which is to feed a module 38 that performs a set of functions complementary to the functions performed respectively by the modules 231 (encoding of the parameter K), 233 (encoding of the parameter $\mu_q$) and 234 (encoding of the optimal masks $M_{ott}$); and the information regarding decoding of the vectors, which is to be sent to a vector-decoding module 39 that performs, according to the parameter K supplied by the module 38, the function complementary to the encoding function performed in the module 25.

The reference number 40 designates a module which, according to the result of the vector decoding (in practice, the quantity Xr corresponding to that generated during encoding by the module 220) and of the parameter $\mu$ supplied by the module 38, performs the functions complementary to the ones performed, during encoding, by the modules 217 (if present), 218 and 219.

The output signal from the module 40 can thus be fed to a de-assembling module 41 which performs, according to the parameter $M_{ott}$ supplied by the module 38, the function complementary to that performed, during encoding, by the module 20.

The output signal from the module 41 corresponds in effect to the de-assembled vectors that are to be sent to the IDCT function, which takes place in the module 33.

The invention thus provides a solution for digital-video-signal compression which is alternative to the MPEG2 standard and is based upon a pyramid vector quantization (PVQ) technique, instead of the scalar quantization of DCT coefficients used in the MPEG2 standard.

The solution according to the invention makes it possible to perform a simplified processing at the macroblock level, so as to obtain the best possible balance between the need to minimize the computational complexity and the processing architectures and the need to ensure a high level of quality. For this purpose, the solution according to the invention is based upon an adaptive assembling technique which finds the optimal partition of the DCT coefficients that are to be assembled in vectors for all the blocks that belong to the macroblocks.

The solution according to the invention enables, by means of a rate-control function, determination of the various quantization levels for the various vectors, on the basis of the comparison of the variance of the vector with a distortion level assigned to the vector. It therefore envisages insertion, into the output bitstream, of parameters necessary for correct decoding of the bitstream, generating an innovative scheme of bitstream syntax.

Experiments conducted by the present applicant show that the solution according to the invention makes it possible to perform compression/encoding of video signals arriving at a bitrate lower than the bitrate that can be achieved using the MPEG2 standard, maintaining the same DPSNR level and the same subjective quality that may be perceived in the image, or, alternatively, the solution according to the invention enables a higher level of quality to be reached when the same bitrate as in the MPEG2 standard is used. The solution according to the invention can therefore be applied to particular advantage in closed systems where there does not exist an imperative need of compatibility with standard video encoding, such as Set Top Box and recordable DVDs with HDD function.

Of course, without prejudice to the principle of the invention, the details of implementation and the embodiments may vary widely with respect to what is described and illustrated herein, without thereby departing from the scope of the present invention as defined in the ensuing claims and the equivalents thereof.

What is claimed:

1. A process for encoding digital video signals organized in frames, comprising: dividing the frames into blocks starting from macroblocks subjected to motion-compensation and applying to said blocks a discrete cosine transform in such a way as to generate respective sets of coefficients;

assembling said sets of coefficients, organizing them in sets of vectors by means of masking;

detecting the variance of said vectors;

quantizing said vectors on a number of available bits by means of a pyramid vector quantizer, associating to said vectors respective quantization pyramids having sizes determined according to said variance and said number of available bits; and encoding the quantized vectors with corresponding codewords.

2. The process of claim 1, comprising the operation of constructing said vectors by re-ordering the coefficients belonging to a single macroblock.

3. The process of claim 1, comprising the operation of performing said masking:

partitioning each block into a given number of subsets according to respective masks and attributing to each of said subsets a respective index; and forming said vectors by means of aggregation of subsets with the same index belonging to different blocks.

4. The process of claim 1, comprising the operation of assembling in a predetermined way the chrominance blocks and the luminance blocks of said digital video signals.

5. The process of claim 1, comprising the operation of assembling said sets of coefficients in the form of mixed vectors corresponding both to luminance blocks and to chrominance blocks of said digital video signals.

6. The process of claim 3, wherein said partitioning operation is performed according to a combination of optimal masks defined according to at least one of the criteria comprised in the group consisting of:

maximization of the sum of the absolute values of the subsets; and minimization of the sum of the standard deviations of the subsets calculated with respect to the absolute mean value.

7. The process of claim 1, comprising the operation of quantizing said vectors as vectors of a given number of coefficients, operating according to a given parameter, each pair of values of said given number and said parameter identifying a corresponding quantization pyramid.

8. The process of claim 1, comprising the operations of:

identifying a distortion value to be used for the quantization of the vectors of a given macroblock; and determining the number of bits with which to encode a given vector as a function jointly of the sampling variance of the vector and of said distortion value.

9. The process of claim 8, comprising the operation of selectively modifying said distortion value.

10. The process of claim 8, comprising the operation of determining the number of bits with which to encode a given vector according to the ratio between said variance of the vector and to said distortion value.

11. The process of claim 8 wherein said distortion value is determined as mean quadratic error deriving from the quantization of said vectors by means of pyramid vector quantization.

12. The process of claim 1, wherein said quantization process comprises the operation of determining the pyramid closest to the vector to be quantized among the pyramids belonging to a family of concentric pyramids.

13. The process of claim 12, wherein, given a pyramid S(L, Q) and a vector of norm H, said vector is considered as lying on the pyramid if H=Q, external to the pyramid is H>Q, and internal to the pyramid if H<Q, and in that the process comprises the operation of projecting said vector on the pyramid in the cases where H is not equal to Q.

14. The process of claim 1, wherein said operation of pyramid vector quantization comprises a preliminary thresholding operation) for setting to zero the coefficients of each vector subjected to quantization that are smaller than a given threshold.

15. The process of claim 1, wherein said pyramid vector quantization comprises at least one between a scaling operation, performed applying a scaling factor to the coefficients of the vector that undergoes quantization, and a rounding-off operation for rounding off to integers the coefficients of the vector that is subjected to quantization.

16. The process of claim 15, wherein said scaling factor is given by the ratio between the norm of the vector subjected to quantization and the size of the quantization pyramid determined according to said variance.

17. The process of claim 15, comprising the operation of defining a maximum scaling-factor value and not subjecting to encoding the vectors for which the scaling factor is higher than said maximum value.

18. The process of claim 1, comprising the operation of encoding said vectors, assigning to each vector a positive integer, the binary representation of which, constituting the corresponding codeword, is given by the sum of the values of the function that associates, to each quantization pyramid, the number of integer points contained on its surface.

19. The process of claim 1, comprising the operation of generating, starting from said quantized and encoded vectors, a bitstream of encoded data comprising, in addition to the codewords corresponding to said quantized and encoded vectors, data identifying at least one of the quantities comprised in the group consisting of:

size of the pyramid used for the pyramid vector quantization of the vector;

number of symbols used for encoding the vector;

quantization pitch;

quantized absolute mean value used for determining the size of the projection pyramid in said pyramid vector quantization; and set of optimal masks used in said masking for the macroblock corresponding to the vector.

20. The process of claim 19, wherein said group comprises a vector-coding-pattern datum identifying the fact that the vector is encoded.

21. A process for decoding digital video signals encoded using the process of claim 1 comprising the operations of:

reconstructing said vectors starting from said codewords;

subjecting said vectors to an operation of inverse pyramid vector quantization so as to generate, starting from said quantized vectors, respective sets of vectors;

subjecting said sets of vectors to de-assembling in such a way as to obtain respective sets of discrete cosine transform coefficients;

subjecting said sets of coefficients to inverse discrete cosine transform, in such a way as to obtain respective blocks of digital-video-signal frames; and subjecting said blocks to motion-compensation so as to obtain, from said blocks, respective macroblocks of a digital video signal organized in frames.

22. The process of claim 21, applied to decoding of signals comprising the operation of extracting from the encoded signals a datum identifying the size of the pyramid, and wherein said operation of reconstructing vectors starting from said codewords is performed according to a parameter of size of the pyramid.

23. The process of claim 22, comprising the operation of extracting from the encoded signals a parameter of absolute mean value, and wherein said operation of inverse pyramid vector quantization is performed on decoded vectors using the parameter of mean absolute value.

24. The process of claim 23, comprising the operation of extracting from the encoded signals datum identifying a set of optimal masks, and wherein said de-assembling operation is performed according to said datum of optimal masks.

25. A system for encoding digital video signals organized in frames, comprising a re-ordering module for dividing said frames into blocks starting from macroblocks subjected to motion-compensation;
- a conversion module for applying to said blocks a discrete cosine transform to generate respective sets of coefficients;
- an assembling module for assembling said coefficients and organizing them in sets of vectors by means of masking;
- a rate-control module sensitive to the variance of said vectors;
- a pyramid vector quantizer for quantizing said vectors on a number of available bits, associating to said vectors respective quantization pyramids having given sizes according to said variance and said number of available bits; and
- an encoding module for encoding the quantized vectors with respective codewords.

26. The system according to claim 25, wherein said assembling module constructs said vectors, re-ordering the coefficients belonging to a single macroblock.

27. The system of claim 26, wherein said assembling module performs said masking by:
- partitioning each block into a given number of subsets according to respective masks and assigning to each of said subsets a respective index; and
- forming said vectors via aggregation of subsets with the same index belonging to different blocks.

28. The system of claim 27, wherein said assembling module assembles in a distinct way the chrominance blocks and the luminance blocks of said digital video signals.

29. The system of claim 27, wherein said assembling module assembles said sets of coefficients in the form of mixed vectors corresponding both to luminance blocks and to chrominance blocks of said digital video signals.

30. The system of claim 27, wherein said assembling module performs said partitioning operation according to a combination of optimal masks defined according to at least one of the criteria comprised in the group consisting of:
- maximization of the sum of the absolute values of the subsets; and
- minimization of the sum of the standard deviations of the subsets calculated with respect to the absolute mean value.

31. The system of claim 25, wherein said quantizer quantizes said vectors as vectors of a given number of coefficients, operating according to a given parameter, each pair of values of said given number and said parameter identifying a corresponding quantization pyramid.

32. The system of claim 31, wherein said rate-control module comprises:
- a detector of a distortion value to be used for the quantization of vectors of a given macroblock; and
- a bit-allocator for determining the number of bits with which to encode a given vector as a function jointly of the sampling variance of the vector and of said distortion value.

33. The system of claim 32, wherein said rate-control module is configured for selectively modifying said distortion value.

34. The system of claim 33, wherein said bit-allocator for determining the number of bits with which to encode a given vector according to the ratio between said variance of the vector and to said distortion value.

35. The system of claim 32, wherein said detector determines said distortion value as mean quadratic error deriving from the quantization of said vectors by means of pyramid vector quantization.

36. The system of claim 25 wherein said quantizer determines the pyramid closest to the vector to be quantized among the pyramids belonging to a family of concentric pyramids.

37. The system of claim 36, wherein, given a pyramid $S(L, Q)$ and a vector of norm H, said vector is considered as lying on the pyramid when H=Q. external to the pyramid is H>Q, and internal to the pyramid when H<Q, and in that the quantizer projects said vector on the pyramid in the cases where H is not equal to Q.

38. The system of claim 25 wherein said quantizer comprises a preliminary thresholding module for setting to zero the coefficients of each vector subjected to quantization that are smaller than a given threshold.

39. The system of claim 25, wherein said quantizer comprises at least one between a scaling module for applying a scaling factor to the coefficients of the vector that undergoes quantization, and a rounding-off module for rounding off to integers the coefficients of the vector that is subjected to quantization.

40. The system of claim 39, wherein said scaling module determines said scale factor as given by the ratio between the norm of the vector subjected to quantization and the size of the quantization pyramid determined according to said variance.

41. The system of claim 40, wherein said scaling module operates according to a maximum scaling-factor value, and wherein the system does not subject to encoding the vectors for which the scaling factor is higher than said maximum value.

42. The system of claim 25 wherein said encoding module encodes said vectors, assigning to each vector a positive integer, the binary representation of which, constituting the corresponding codeword, is given by the sum of the values of the function which associates, to each quantization pyramid, the number of integer points contained on its surface.

43. The system of claim 25 comprising an aggregation module for generating, starting from said quantized and encoded vectors, a bitstream of encoded data comprising, in addition to the codewords corresponding to said quantized and encoded vectors, data identifying at least one of the quantities comprised in the group consisting of:
- size of the pyramid used for the pyramid vector quantization of the vector;
- number of symbols used for encoding the vector;
- quantization pitch;
- quantized absolute mean value used for determining the size of the projection pyramid in said pyramid vector quantization; and
- set of optimal masks used in said masking for the macroblock corresponding to the vector.

44. The process of claim 43, wherein said group of quantities moreover comprises a vector-coding-pattern datum identifying the fact that the vector is encoded.

45. A system for decoding encoded digital video signals, comprising:
- a vector-decoding module for reconstructing vectors starting from codewords;
- a dequantization module for subjecting said vectors to an operation of inverse pyramid vector quantization so as to generate, starting from said quantized vectors, respective sets of vectors;

a de-assembling module for subjecting said sets of vectors to de-assembling in such a way as to obtain respective sets of discrete cosine transform coefficients;

an inverse-transform module for subjecting said sets of coefficients to inverse discrete cosine transform, in such a way as to obtain respective blocks of digital-video-signal frames; and a motion-compensation set for subjecting said blocks to motion-compensation so as to obtain, from said blocks, respective macroblocks of the digital video signal organized in frames.

46. The system of claim 45, comprising an extractor module for extracting from the encoded signalsdatum identifying the size of the pyramid, and wherein said vector-decoding module operates according to said parameter of size of the pyramid.

47. The system of claim 46, comprising an extractor module for extracting from the encoded signals a parameter of absolute mean value, and wherein said de-quantization module operates on decoded vectors according to said parameter of mean absolute value.

48. The system of claim 45 comprising an extractor module for extracting from the encoded signals datum identifying a set of optimal masks, and wherein said de-assembling module operates according to said datum of optimal masks.

49. A computer program product directly loadable into the memory of a digital computer and comprising software code portions for performing the operations to claim 1 when said product is run on a computer.

50. A process for encoding digital video signals organized in frames, the process comprising:

dividing the frames into blocks starting from macroblocks subjected to motion-compensation;

subjecting the blocks to a discrete cosine transform and generating respective sets of coefficients therefrom;

assembling the respective sets of coefficients into sets of vectors;

detecting the variants of the vectors;

quantizing the vectors by means of a pyramid vector quantizer;

associating to the vectors respective quantization pyramids having sizes in accordance with the detected variants and the number of available bits; and encoding the vectors with respective code words.

51. The process of claim 50, wherein the sets of coefficients are assembled and organized into sets of vectors by means of a masking operation.

* * * * *